May 19, 1959   J. A. W. MADSEN   2,886,997
ROTARY IMPACT WRENCH MECHANISM
Filed Nov. 14, 1957   4 Sheets-Sheet 1
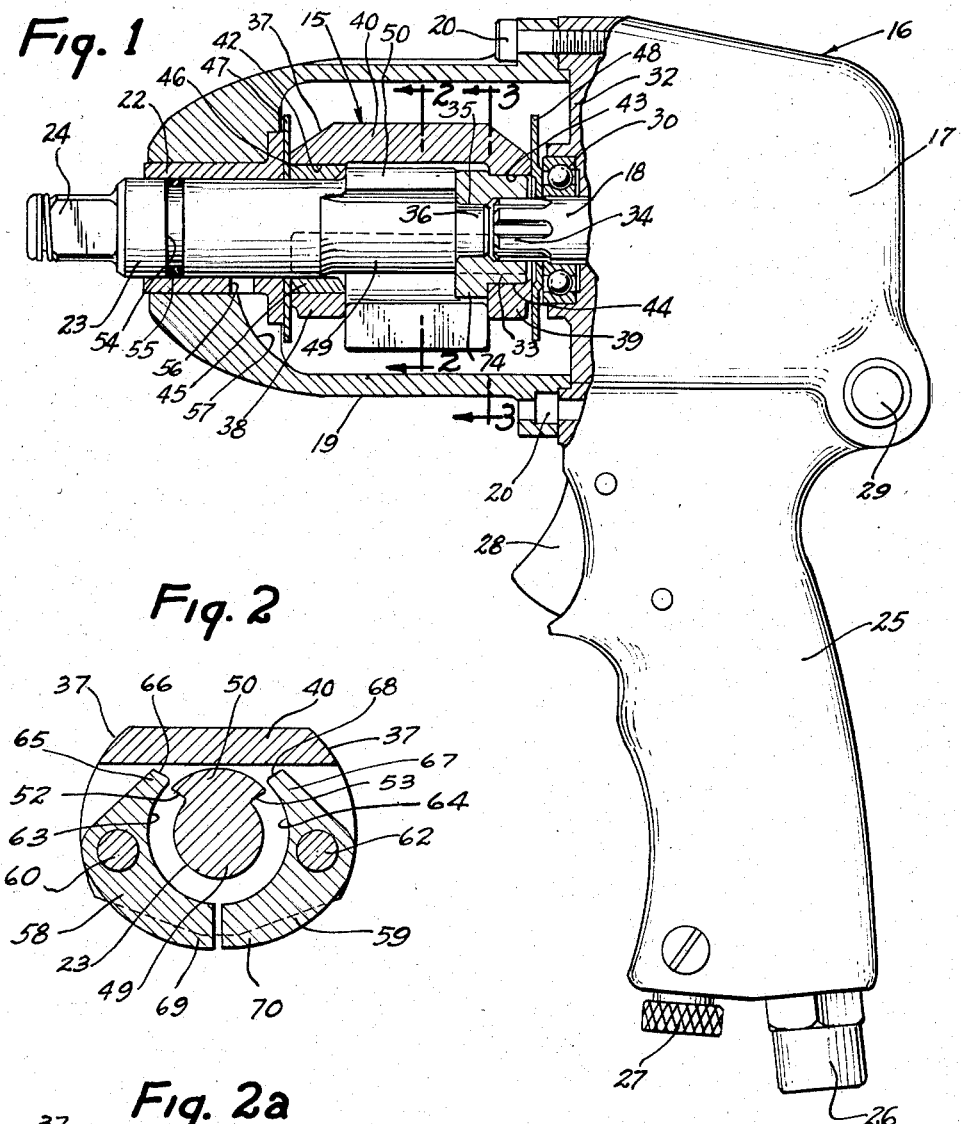
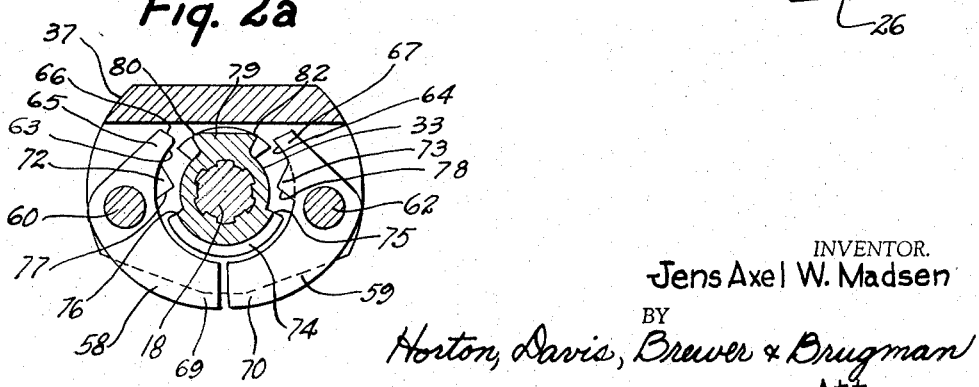
INVENTOR.
Jens Axel W. Madsen
BY
Horton, Davis, Brewer & Brugman
Attorneys

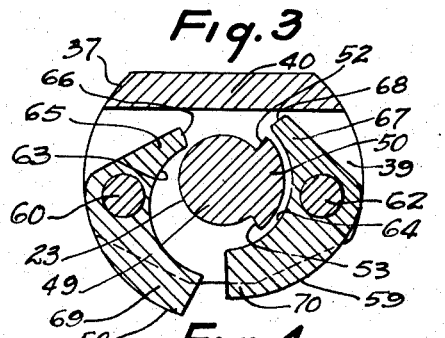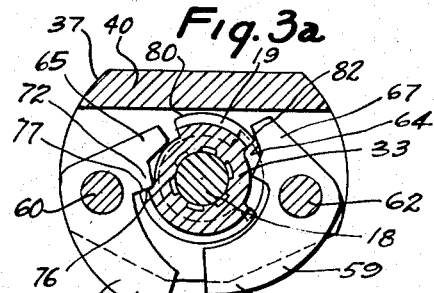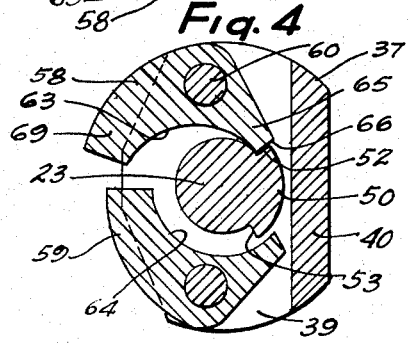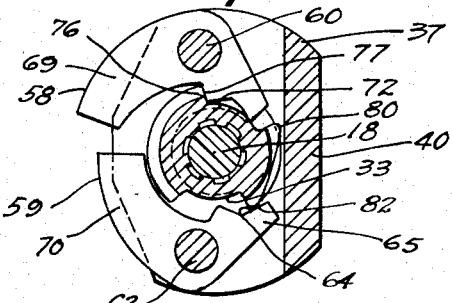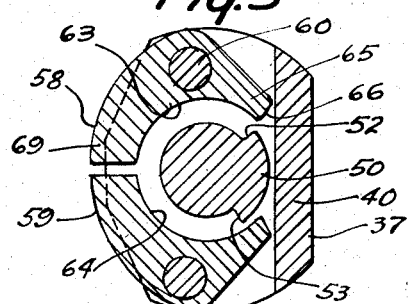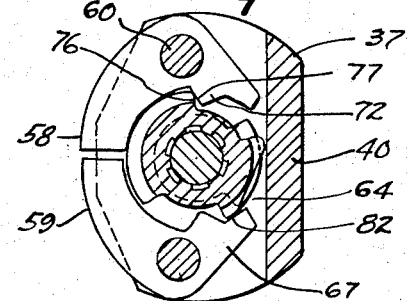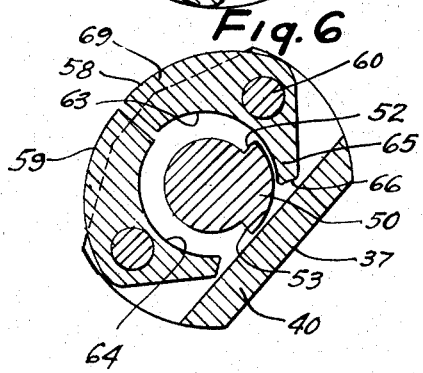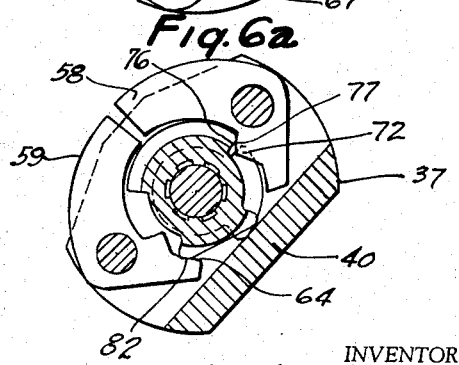

May 19, 1959
J. A. W. MADSEN
2,886,997
ROTARY IMPACT WRENCH MECHANISM
Filed Nov. 14, 1957
4 Sheets-Sheet 3
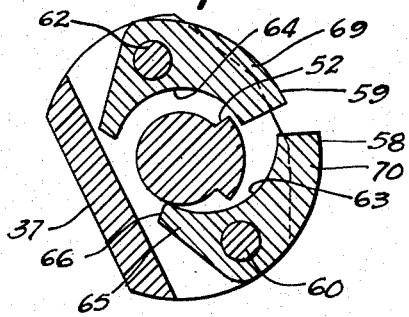
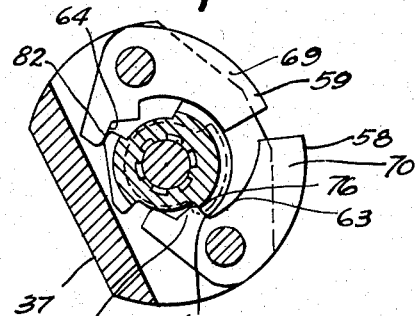
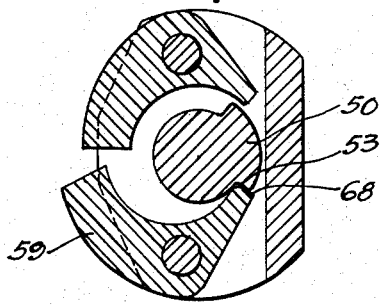
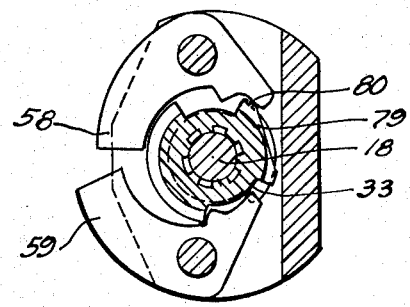
INVENTOR.
Jens Axel W. Madsen
BY
Horton, Davis, Brewer & Brugman
Attorneys

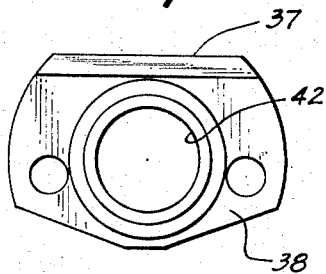
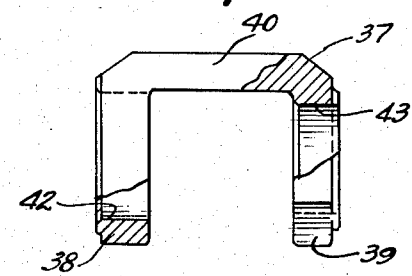
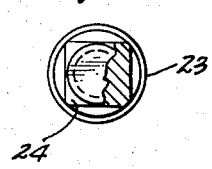
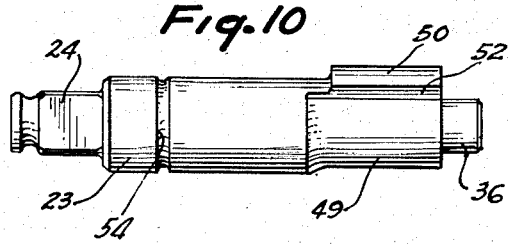
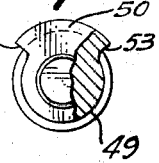
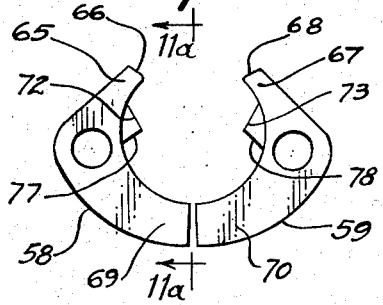
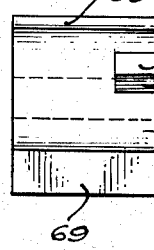
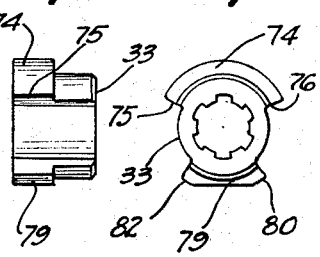
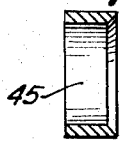

United States Patent Office 2,886,997
Patented May 19, 1959

2,886,997

ROTARY IMPACT WRENCH MECHANISM

Jens Axel W. Madsen, Sioux City, Iowa, assignor to Albertson & Company, Inc., Sioux City, Iowa, a corporation of Iowa Application November 14, 1957, Serial No. 696,377

14 Claims. (Cl. 81—52.3)

This invention relates to rotary impact wrench mechanisms, and more particularly to such mechanisms having parts which function automatically during rotational movements to deliver a series of impact blows to a rotatable spindle or the like, thereby to provide instantaneous torque impulses to the driven spindle which, by virtue of the mass and speed of movement of parts of the impact mechanism during operation, very greatly exceed the normal torque of the motivating element.

Rotary impact wrench mechanisms, as presently known and used, fall generally into two relatively different and distinct types or classes. There are those which differ materially from the type herein disclosed and which utilize a resilient energy accumulating part which stores energy from a motivating element and, upon the development of some predetermined condition, release that stored energy to an impact hammer. Then, there are the impact mechanisms of the type herein depicted and wherein the driving force of a motivating element is transmitted directly to the impact hammer mechanism, and wherein the operation, to a material degree, is dependent upon the ability of the motivating element to accelerate and decelerate very rapidly.

In both types of mechanisms, the parts are subjected to substantial and rapidly recurring shocks which necessitate resistance to breakage. Also, in the latter mentioned type, in which driving force of the motivating element is transmitted directly to the impact hammer mechanism, the efficiency, power and operation are influenced directly and materially by the mechanical losses, such as friction, in the impact hammer mechanism.

One of the objects of this invention is to provide a rotary impact mechanism adapted to use in an impact tool wherein the driving force of the motivating element of the tool is transmitted directly to the impact mechanism, and wherein the frictional and other mechanical losses in the mechanism are minimized.

Another object of the invention is to provide a rotary impact mechanism having high operating efficiency and adapted to be driven by an air motor.

This invention also has within its purview the provision of a rotary impact mechanism wherein the vibration during use is limited by a balanced arrangement of the parts of the mechanism.

It is another object of my invention to provide a rotary impact mechanism adapted to operation by an air motor and wherein the parts of the impact mechanism are constructed and arranged to withstand the impact forces of operation through periods of long service without breakage.

Other objects and advantages of the invention will be apparent from the following description and the accompanying drawings in which similar characters of reference indicate similar parts throughout the several views.

Referring to the four sheets of drawings:

Fig. 1 is a side elevational view of an impact wrench embodying a preferred from of this invention and has a portion of the disclosed structure cut away and shown in section to illustrate details of the portion of the wrench structure to which this invention is particularly directed;

Figs. 2 and 2a, 3 and 3a, 4 and 4a, 5 and 5a, 6 and 6a, 7 and 7a, and 8 and 8a are end sectional views of the impact mechanism illustrated in Fig. 1, wherein the sections are taken substantially on lines 2—2 and 3—3 respectively and in the directions of the arrows depicted in Fig. 1;

Figs. 9 and 9a are respectively end and side elevational views of a frame part utilized in the impact mechanism shown in Fig. 1, and Fig. 9a has portions broken away to illustrate details of structure;

Figs. 10, 10a and 10b are respectively side elevational and opposite end elevational views of a spindle part of the mechanism of Fig. 1, wherein portions are broken away in the end views to illustrate details of structure;

Fig. 11 is an end elevational view of hammer parts of the mechanism shown in Fig. 1;

Fig. 11a is a side elevational view of one of the hammer parts depicted in Fig. 11, and is taken substantially as indicated by a line 11a—11a and accompanying arrows in Fig. 11;

Figs. 12 and 12a are respectively side elevational and end views of a driving cam part of the mechanism shown in Fig. 1; and Figs. 13 and 13a are respectively end elevational and side sectional views of a bearing part of the mechanism of Fig. 1.

In the disclosed embodiment of my invention which is shown for illustrative purposes, an impact mechanism 15 comprises an essential portion of my invention and is illustrated in an adaptation to use as a part of an impact wrench 16 which, in the present instance, embodies an air-operated prime mover enclosed within a housing 17 for driving a drive shaft 18, and which prime mover, in its illustrated adaptation, desirably has rapid acceleration and deceleration characteristics. In the disclosed structure, a housing 19 secured to the housing 17 by fastening means such as screws 20 encloses the impact mechanism 15 and provides a bearing 22 in which a driven spindle 23 of the impact mechanism is journalled for rotation; that driven spindle having on the projecting end thereof a polygonal fitting 24 for receiving and carrying various removable tools, such as socket wrenches, having sockets therein which fit the fitting.

The disclosed impact wrench, in the form illustrated, has a pistol-type grip 25 projecting from the lower portion of the housing 17, at the lower end of which grip a fitting 26 is provided for connection through a suitable conduit, such as a flexible hose, to a source of compressed air for operating the prime mover. A knob 27 at the lower end of the grip actuates a valve for the control of the air flow to the prime mover, which air flow is turned on and shut off by operation of a trigger 28. An actuating button 29 which is exposed at opposite sides of the housing 17 at the upper portion of the grip 25 operates a valve within the housing to effect reversal of the operation of the prime mover.

In their assembled relationship, the driven spindle 23 and the drive shaft 18 are in substantially coaxial and end-to-end relationship to one another, and the end of the drive shaft 18 is supported for rotation by an antifriction bearing 30 supported by an end wall 32 of the housing 17. A driving cam 33 is drivingly connected to a splined end portion 34 of the drive shaft 18 and has an internal bearing 35 at the end opposite that which is engaged with the splined end portion 34 of the drive shaft, which internal bearing affords a support in which an end portion 36 on the driven spindle 23 is journalled for rotation.

A substantially U-shaped frame 37 has end portions 38 and 39 and a connecting portion 40 which are integral.

Coaxial bearing bores 42 and 43 are provided in the end portions 38 and 39 respectively of the frame and have an axis spaced from the connecting portion 40 of the frame. At one end, the frame is journalled for rotation on an external bearing 44 at the end of the driving cam 33 adjacent the drive shaft 18. At the other end of the frame, a bearing ring 45 is rotatably journalled in the bearing bore 42, and that bearing ring is, in turn, journalled for rotation on a bearing portion 46 of the driven spindle. At the opposite ends of the frame, discs 47 and 48 are mounted on the driven spindle 23 and drive shaft 18 respectively and project outwardly across the ends of the frame 37.

Within the frame 37, an end portion 49 of the driven spindle is shaped, as by milling, to provide an anvil 50 having impact surfaces 52 and 53 which project outwardly relative to the axis of the spindle in substantially radial directions and which are in spaced and opposed relationship circumferentially of the spindle. In the disclosed structure, and although not in any way limited to such angular disposition, the anvil 50 spans approximately 90° peripherally of the spindle, so that the impact surfaces are separated by approximately 270° around the end portion 49 of reduced section on the spindle. Near the outer end of the driven spindle, an oil seal is provided by a circumferential groove 54 in the spindle between the ends of the bearing 22 and relatively near the outer end thereof, and an oil sealing ring 55 disposed in the groove and extending circumferentially of the spindle. Oil reaches the inner surface of the bearing 22 through an oil hole 56 therein which communicates with the interior of the housing 19 through a groove 57 in the outer end wall thereof.

Hammers 58 and 59 are supported for rotational movements between the end portions 38 and 39 of the frame by pins 60 and 62 respectively which extend axially of the spindle in substantially parallel relationship thereto and have axes disposed in equi-distant and substantially balanced relationship on opposite sides of the spindle as well as being spaced farther from the connecting portion of the frame than the axis of the spindle. The pins 60 and 62 are held in place axially of the frame by the discs 47 and 48. The hammers 58 and 59 are similar and reversed in shape and have curved or arcuate inner surfaces 63 and 64 which, in the normal positions of the hammers shown in Fig. 2 and 2a, are spaced radially outward from the anvil 50 and the driving cam 33. Also, the outer contours of the hammers are such that they have end portions which extend in generally acute angular relationship from the axes of the pins 60 and 62 by which the hammers are supported on the frame. The hammer 58 has an end portion 65 having an impact surface 66 at the end thereof and which is substantially normal to a plane extending through the axis of the pin 60. Likewise, the hammer 59 has an end portion 67 which has an impact surface 68 at the end thereof and which is substantially normal to a plane passing through the axis of the pin 62. At their opposite ends, the hammers 58 and 59 have weighted end portions 69 and 70 respectively which are both longer and of heavier section than the end portions 65 and 67 and have greater mass than those latter mentioned end portions, so that they serve as weights responsive to centrifugal force during rotation of the frame to effect outward swinging movement of the weighted ends and inward swinging movement of the other ends of the hammers relative to the pins 60 and 62 when the hammer is free to move in response to such centrifugal force. Thus, during rotation of the frame and the hammers relative to the axis of the spindle 23 and drive shaft 18, centrifugal force is utilized to bring the impact surfaces of the hammers selectively into position for engagement with the impact surfaces 52 and 53 of the anvil 50. Furthermore, and although each hammer serves to balance the other for limiting vibration during operation in either direction, the oppositely disposed hammers are utilized individually and selectively with one hammer impact surface coacting with a single anvil impact surface for each direction of rotation of the frame relative to the driven spindle.

Near one end, as shown in Figs. 11 and 11a, each of the hammers 58 and 59 is provided with an inner protuberance, such as 72 on the hammer 58 and 73 on the hammer 59, of angular configuration, which protuberances are aligned axially of the driven spindle with a cam portion 74 of the driving cam 33. This cam portion 74 of the driving cam spans an arc of less than 180° of the circumference of the driving cam and provides cam surfaces 75 and 76 in opposed and circumferentially spaced relationship relative to the axis of the drive shaft and which project outwardly in a substantially radial direction from that axis. Upon rotation of the drive shaft 18 in one direction, the cam surface 76 on the driving cam engages a cam surface 77 on the protuberance 72 to transmit driving force to the frame through the hammer 58 and pin 60 to effect rotation of the frame, while during rotation of the drive shaft 18 in the opposite direction, the cam surface 75 on the driving cam engages a cam surface 78 on the protuberance 73 to transmit driving force through the hammer 59 and pin 62 to the frame, thereby to effect rotation of the frame in the opposite direction relative to the driven spindle 23.

For effecting selective retention of one of the hammers in an inoperative, normal or neutral position for each direction of rotation of the drive shaft and frame relative to the driven spindle, the driving cam has a protuberance thereon at a position diametrically opposed to the cam portion 74, which protuberance has surfaces 80 and 82 thereon at positions spaced circumferentially of the driving cam. Depending upon the direction of rotation of the prime mover and the drive shaft 18, the surface 80 on the driving cam is engageable with the arcuate inner surface of the end portion 65 of the hammer 58, and the surface 82 on the driving cam is engageable with the arcuate inner surface 64 of the end portion 67 of the hammer 59. Engagement of one of the surfaces 80 or 82 with the inner surface of one of the hammers 58 or 59 holds the engaged hammer in a position free of contact with the driven spindle or anvil, so that it cannot respond to centrifugal force acting upon the weighted end thereof, but leaves the other hammer free to move in response to such centrifugal force.

With the parts in the positions depicted in Figs. 2 and 2a, the hammers are in their normal, neutral or inoperative positions, and initial rotation of the drive shaft 18 and driving cam 33 in either direction will place one of the surfaces of the protuberance 79 under one end of one of the hammers to render that hammer inactive, while leaving the other hammer free for operative purposes. As shown in Figs. 3 and 3a, the drive shaft 18 and driving cam 33 have started to rotate in a clockwise direction, as viewed in Fig. 3a. This has placed the surface 82 of the protuberance 79 on the driving cam under the end portion 67 of the hammer 59 to hold that hammer in its neutral or normal position, out of contact with the anvil or driven spindle. Also, the initial rotation of the drive shaft 18 and driving cam 33 has effected driving contact between the surface 76 on the driving cam and the surface 77 of the protuberance 72 on the hammer 58 to transmit driving force from the driving cam and through the hammer 58 and pin 60 to the frame 37. This starts outward swinging movement of the weighted end portion 69 of the hammer 58 and inward swinging movement of the end portion 65 of that hammer without effecting contact between the hammer impact surface 66 and the impact surface 52 of the anvil 50 on the driven spindle. It does, however, start to bring the impact surface 66 into a position of radial alignment with the impact surface 52 of the hammer as the rotating parts of the mechanism, including the frame 37 and hammers 58 and 59, gain speed and momentum. Inward movement of the hammer end portion 65 is stopped by its engagement with the arcuate surface of the driving cam, as shown in Fig. 3a, with which the hammer rotates or travels. As indicated by dotted lines in Fig. 3a, the arcuate surface of the driving cam has a larger diameter than the arcuate surface of the spindle adjacent the anvil, so that the end portion 65 of the hammer does not, and cannot have frictional engagement with the spindle while approaching the anvil to produce the impact.

In the positions of the parts depicted in Figs. 4 and 4a, the hammer 59 is still in its normal or neutral position, out of contact with the anvil, and centrifugal force acting upon the heavier end portion 69 of the hammer 58 has brought the impact surface 66 of that hammer into position for impact with the impact surface 52 of the anvil 50 on the driven spindle 23, as depicted in Fig. 4. At the instant of impact, the kinetic energy of the driving parts, including the frame 37 and the hammers 58 and 59, is transmitted to the driven spindle 23 through the anvil 50 and the motion of the driven parts is suddenly decelerated, so that centrifugal force is no longer effective to hold the hammer 58 in the position illustrated in Fig. 4a. Immediately following the impact and the deceleration of the driving parts, a component of force is exerted against the cam surface 77 on the hammer 58 by the cam surface 76 on the driving cam 33 which, by virtue of the position of the cam surface 77 on the hammer 58 relative to the axis of rotational movement of that hammer relative to the frame about the pin 60, swings the hammer back to its normal position, as shown in Figs. 5 and 5a, so that the hammer is free to pass the anvil 50 without contact therewith, as depicted in Fig. 6, whereupon another cycle of operation is started, with the hammer 58 starting to swing outwardly at the heavier end, as shown in Fig. 6a, as acceleration of the driving parts is started.

At the commencement of this acceleration, the cam surface 76 on the driving cam and the cam surface 77 on the hammer 58 are in angular relationship to one another, as shown in Fig. 6a. However, as the hammer 58 swings relative to the frame under the influence of centrifugal force as the acceleration continues, the cam surfaces 76 and 77 on the driving cam and hammer respectively are brought into surface contact, as shown in Fig. 7a, and the impact surface 66 on the hammer is brought into a position of radial alignment with the impact surface 52 on the anvil preparatory to another impact between those surfaces and a succeeding cycle of operation. It may be observed that the hammer 59 which is retained in its normal or neutral position by the protuberance 79 on the driving cam remains out of contact with the anvil and driven spindle during operation, so that there is no friction therebetween, and the progressive movements of the hammer 58 occur without frictional contact between that hammer and the anvil or driven spindle, so that the parts function with a minimum of frictional resistance to their movements during the successive cycles of operation.

Figs. 8 and 8a show the positions of the frame, driving cam, hammers, driven spindle and anvil during a stage of the operation of the parts in a direction opposite to that which has been described, and wherein the drive shaft 18 and the driving cam 33 are rotating in a counterclockwise direction, as viewed in those figures. As there depicted, the hammer 58 is held in its normal or neutral position by engagement with the surface 80 on the protuberance 79 of the driving cam, and the hammer 59 is swung to a position, as the result of centrifugal force, in which the impact surface 68 of that hammer is disposed for impact with the impact surface 53 of the anvil. The cycles of operation in the counterclockwise direction are similar to those described with respect to clockwise rotation, except that the hammer 59 is active to produce the impacts against the impact surface 53 of the anvil, rather than the hammer 58 engaging the impact surface 52 of the anvil.

From the foregoing description and reference to the accompanying drawings, it may be readily understood that I have provided an impact mechanism adapted to use in impact wrenches and the like and adapted to be driven by a prime mover having rapid acceleration and deceleration characteristics, and which mechanism operates with a minimum of frictional losses to transform kinetic energy into a rapid series of impacts for effecting rotational movement of a driven spindle. It may also be observed that since the hammers are symmetrically disposed with respect to the axis of rotation of the drive shaft and driven spindle and have their heavier or weighted ends on the opposite side of the axis of rotation from the connecting portion of the frame, the parts have a dynamic balance which minimizes vibration during operation.

It is understood that the foregoing description is merely illustrative of a preferred embodiment of the invention and that the scope of the invention is not to be limited thereto but is to be determined by the appended claims.

I claim:

1. A rotary impact mechanism adapted to be driven by a reversible fluid operated motivating element having very rapid acceleration and deceleration characteristics to deliver a succession of torque impulses to a driven element and comprising, in combination, a housing having a bearing therein, a frame constituting an integral substantially U-shaped member having end and connecting portions, the end portions of said frame having substantially coaxial bearing bores therein which are spaced from the connecting portion, a driving cam journalled for rotational movement in one of said bearing bores and having means for providing a driving connection to the motivating element, a driven spindle having anvil, bearing and connecting portions, said bearing portion of the driven spindle being journalled for rotation in said bearing in the housing and extending into the other of said bearing bores in the frame to provide a support relative to which the frame is normally rotatable, said anvil portion of the driven spindle being between the end portions of the frame, hammers mounted on the frame between the end portions thereof in alignment with the anvil and supported for rotational movements about axes on opposite sides of the driven spindle and spaced from the connecting portion of the frame, said hammers each having an impact portion at one end engageable with the anvil portion of said driven spindle during rotation of the frame in one direction and a weight portion at the opposite end normally swingable away from the driven spindle in response to centrifugal force during rotation of the frame to move the impact portion thereof into position for engagement with the anvil portion of the driven spindle, said driving cam having portions thereon selectively engageable with the impact portions of the hammers depending upon the direction of rotation of the driving cam to hold one of the hammers in an inoperative position during rotation of the frame in each direction, said cam also having surfaces thereon which are selectively and alternately engageable with aligned surfaces on the hammers depending on the direction of rotation of the driving cam to effect rotation of the frame in the selected direction, and the latter mentioned surfaces of the hammers being displaced from the axes of rotational movement of the hammers relative to the frame in a direction and amount to effect movement of the impact portion away from the anvil portion of the driven spindle upon deceleration of the frame resulting from the impact between the impact portion of the hammer with the anvil portion of the driven spindle.

2. A rotary impact mechanism as defined in claim 1, and wherein the axes of rotational movements of the hammers relative to the frame are farther from the connecting portion of the frame than the axis of said bearing bores.

3. A rotary impact mechanism as defined in claim 1, and wherein said surfaces on the driving cam which are selectively engageable with surfaces of the hammers are separated and opposed circumferentially of the driving cam, and the latter mentioned surfaces on the hammers are substantially radial to the axes of rotational movements of their respective hammers.

4. A rotary impact mechanism as defined in claim 1, and wherein said hammers and said anvil portion of the driven spindle engage only to provide impact therebetween during normal operation of the mechanism.

5. A rotary impact mechanism as defined in claim 1, and wherein the impact and weight portions of the respective hammers extend in generally acute angular relationship from one another and have their impact portions extending toward the connecting portion of the frame and their weight portions on the opposite sides of their respective axes of rotational movement from the said connecting portion of the frame.

6. A rotary impact mechanism adapted to be driven by a reversible motivating element which is capable of very rapid acceleration and deceleration and comprising, in combination, support means having a bearing therein, a spindle journalled for rotational movement in said bearing and having an anvil portion exterior to the bearing and providing anvil impact surfaces in opposed relationship to one another and projecting in an outward radial direction in spaced relationship circumferentially of the spindle, a substantially U-shaped frame having integral leg and connecting portions, said leg portions having coaxial bores therein in spaced relationship to the connecting portion and journalled for rotation on said spindle at opposite ends of the anvil portion thereof, a driving cam having means for providing a driving connection to the motivating element, means supporting the driving cam for rotational movement relative to the frame and in concentric relationship to the spindle, hammers mounted on the frame between the leg portions thereof in longitudinal alignment with the anvil, means supporting the hammers for rotational movements relative to the frame about axes spaced from the connecting portion of the frame and located on opposite sides of the spindle, said hammers each having an impact portion providing an impact surface at one end engageable with one of said anvil impact surfaces during rotation of the frame in one direction, said hammers also each having a weight portion at its opposite end normally swingable away from the spindle in response to centrifugal force during rotation of the frame to move the impact surface thereof into position for engagement with one of the anvil impact surfaces, said driving cam having means thereon selectively engageable with one of the hammers in each direction of rotation of the driving cam to hold that one of the hammers in an inoperative position away from the anvil portion of the spindle, said cam also having means thereon for engagement with one of the hammers during each direction of rotation of the driving cam to transmit rotational driving force from the motivating element to the frame, and the last mentioned means having a component of force for moving the impact surface of the hammer away from the anvil impact surface upon deceleration of the frame resulting from the impact between said impact surfaces.

7. A rotary impact mechanism as defined in claim 6, and wherein said impact and weight portions of each of the hammers extend in angular relationship to one another from said means supporting the hammers for rotational movements relative to the frame.

8. A rotary impact mechanism as defined in claim 6, and wherein said weight portions of the hammers extend generally toward one another on the side of the spindle opposite the connecting portion of the frame.

9. A rotary impact mechanism as defined in claim 6, and wherein the impact portions of the hammers extend toward the connecting portion of the frame from the said means supporting the hammers for rotational movements relative to the frame.

10. A rotary impact mechanism as defined in claim 9, and wherein the impact surfaces of the hammers are each substantially normal to a plane passing through the axis of said means supporting the hammer for rotational movements relative to the frame.

11. A rotary impact mechanism comprising, in combination, means rotatably supporting a driving shaft and a driven spindle in end-to-end coaxial relationship to one another, reversible means for rotating the driving shaft in either direction, a frame having connected end portions journalled for rotation relative to the shaft and spindle, said driven spindle having an anvil portion between the end portions of the frame, said anvil portion providing impact surfaces in opposed and spaced relationship circumferentially of the spindle, hammers mounted on the frame between the end portions thereof and having end portions aligned with the impact surfaces of the anvil, means supporting the hammers relative to the frame for rotational movements relative to the frame about axes spaced from the anvil, said hammers each having end portions extending from the axis of rotational movement thereof in angular relationship to one another, one of said end portions of each hammer being heavier than the other so that centrifugal force normally tends to swing the heavier end outwardly during rotation of the frame, thereby to swing the other end inwardly to a position for contacting an impact surface of the anvil, a driving cam drivingly connected to the driving shaft and rotatable relative to the frame, means on the driving cam for selectively engaging one of the hammers during rotation of the driving shaft in each direction to hold the engaged hammer in an inoperative position out of engagement with the anvil, and said hammers and driving cam having selectively engageable means thereon for driving the frame and moving each of the hammers about its supporting axis following impact between that hammer and the anvil.

12. In an impact mechanism having a rotary drive shaft and a driven spindle in coaxial relationship to one another and anvil means providing an impact surface extending longitudinally of and radially outward from the spindle axis, the combination comprising a frame supported for rotation relative to the spindle and shaft in alignment with the impact surface axially of the spindle, a hammer mounted on the frame for rotational movements relative thereto about an axis spaced radially from the spindle and having a curved inner surface spaced from the anvil radially of the spindle, said hammer having end portions on opposite sides of the axis of rotational movements thereof relative to the frame, one of said end portions having more mass than the other and said other end portion having an impact surface thereon so that during rotation of the frame centrifugal force effects movement of the said one end portion away from the spindle and the impact surface of the hammer is moved into position for engagement with the impact surface of the anvil, a driving cam having a driving connection to the drive shaft and having cam surface thereon, and means providing a cam surface projecting from the curved surface of the hammer at a position spaced from the axis of rotational movements of the hammer relative to the frame and aligned with the cam surface of the driving cam, said cam surface of the driving cam being engageable with the cam surface of the hammer to drive the frame and providing a component of force to move the hammer to a position free of the anvil after impact of the impact surfaces.

13. In an impact mechanism adapted to actuation by a rotary drive shaft and embodying a driven spindle having an anvil impact surface thereon, the combination comprising a frame, means supporting the frame for rotation in concentric relationship to the spindle at a position aligned axially of the spindle with the anvil impact surface, a hammer, means supporting the hammer relative to the frame for rotational movements relative thereto between normal and impact positions, said hammer being free of contact with the anvil during rotation of the frame when the hammer is in said normal position, said hammer also having oppositely extending weighted and impact end portions and being movable between its normal position and the impact position in which the impact end is disposed for engagement with the anvil impact surface by centrifugal force during rotation of the frame, a driving cam, and engageable cam surfaces on the driving cam and hammer for transmitting driving force to the frame for effecting rotation thereof and said cam surfaces, when engaged, providing a force component for moving the hammer from the impact position to the normal position following each engagement of the impact end portion of the hammer with the anvil impact surface.

14. In an impact mechanism as defined in claim 13, said driving cam having surfaces thereon which act as stops for limiting rotational movements of the impact portion of the hammer relative to the frame at the impact position and which thereby prevent frictional engagement of the impact portion of the hammer with the spindle prior to the impact thereof with the anvil impact surface and when the hammer is in the impact position.

References Cited in the file of this patent

UNITED STATES PATENTS

| | | |
|---|---|---|
| 2,341,497 | Amtsberg | Feb. 8, 1944 |
| 2,711,662 | Shaff | June 28, 1955 |
| 2,768,546 | Amtsberg | Oct. 30, 1956 |
| 2,784,625 | Maurer | Mar. 12, 1957 |
| 2,784,818 | Maurer | Mar. 12, 1957 |
| 2,842,994 | Stine | July 15, 1958 |

FOREIGN PATENTS

| | | |
|---|---|---|
| 525,782 | Canada | June 5, 1956 |